(12) United States Patent
Yehuda et al.

(10) Patent No.: US 7,934,248 B1
(45) Date of Patent: Apr. 26, 2011

(54) NETWORK POLICY ENFORCEMENT DASHBOARD VIEWS

(75) Inventors: Hanna Yehuda, Newton, MA (US); Daniel C. Lanzi, Wilton, CT (US); Oran Epelbaum, Tel Aviv (IL); Frank Murphy, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 972 days.

(21) Appl. No.: 11/769,561

(22) Filed: Jun. 27, 2007

(51) Int. Cl.
*G06F 17/00* (2006.01)
*G06F 7/04* (2006.01)

(52) U.S. Cl. .................. 726/1; 726/2; 726/26; 726/27; 709/224; 709/225; 713/153; 713/166

(58) Field of Classification Search .................. 726/1
See application file for complete search history.

(56) References Cited

U.S. PATENT DOCUMENTS

| | | | |
|---|---|---|---|
| 7,627,891 B2 * | 12/2009 | Williams et al. ............. | 726/1 |
| 2002/0091942 A1 * | 7/2002 | Cooper et al. .............. | 713/201 |
| 2002/0178246 A1 * | 11/2002 | Mayer ........................ | 709/223 |
| 2006/0149408 A1 * | 7/2006 | Speeter et al. ............. | 700/126 |

OTHER PUBLICATIONS

"Agent-Less and Agent-Based Network Access Control Security, Functionality and Cost Tradeoffs", Infoexpress, 2006—for the teaching of agent-less probing of Network Activity.*
"Agent-based vs. Agent-less Management", NTP Software White Paper, Rev. 1.2, Jul. 2001.*

* cited by examiner

*Primary Examiner* — Taghi T Arani
*Assistant Examiner* — Mohammad L Rahman
(74) *Attorney, Agent, or Firm* — Krishnendu Gupta; Gerald P. Kazanjian (57) ABSTRACT

A network compliance application performs a method of coalescing violation data based on rule and policy violations by retrieving network event data indicative of compliance with a set of policies, in which each of the policies has a set of rules. The application computes, for each of the policies, violations, each violation indicative of a deviation from a particular rule, and displays a summary view indicative of a plurality of policies in the set of policies, the summary view indicative of violations attributable to each of the policies. From the displayed summary view, the application receives a detail selection corresponding to a subset of the displayed violations in the summary view; displays, for the received detail selection, a violation view having a sequence of ranked violation entries corresponding to the detail selection.

18 Claims, 13 Drawing Sheets

| Dashboard | Policies | Templates | Violations | Audit Log | Administration | | | Logout ? | EMC ARUBA |
|---|---|---|---|---|---|---|---|---|---|

Violations - Filtered

| Active ▼ | Any ▼ | Any ▼ | | Any ▼ | Any ▼ | |
|---|---|---|---|---|---|---|
| State | Priority | Policy | Rule | Affected Item | Age (hrs ago) | Last Changed Time (GMT +01:00) |
| Active | ⊗ High | HIPAA | Connectivity relationship | Oracle server on 10.1.1.23 | 2:00 | 2007-02-03 22:20 |
| Active | ⚠ Medium | HIPAA | Domain access | Oracle server on 10.1.3.88 | 3:00 | 2007-02-03 22:20 |
| Active | ⚠ Medium | HIPAA | Configuration changes detected | Oracle server on 10.1.3.75 | 3:12 | 2007-02-03 22:20 |
| Active | ⚠ Medium | HIPAA | Naming conventions | Oracle server on 10.3.6.99 | 4:00 | 2007-02-03 22:20 |
| Active | ⚠ Medium | HIPAA | Authorized connection protocols | Oracle server on 10.1.1.23 | 4:18 | 2007-02-03 22:20 |
| Active | ⚠ Medium | HIPAA | Job status | Oracle server On 10.1.1.24 | 5:30 | 2007-02-03 22:20 |
| Active | ⊙ Low | HIPAA | Deleted user ID's | Oracle server on 10.1.1.33 | 6:00 | 2007-02-03 22:20 |

[Acknowledge] [Unacknowledge] [Clear]   Filter found 15 out of 20   Showing 1 - 10 of 15  |◁ ◁ Page 1 ▷ ▷|  of 1

Details

[Violation Causes] [Rule Information] [Acknowledge and Notes] [Add Note] [Timeline]

| Affected Item: | Oracle server on 10.1.1.23 |

Violated Conditions

| Violated Condition | Expected Value | Actual Value |
|---|---|---|

| User: Joe Smith | Role: Compliancy Officer | 2007-05-01 19:20 (GMT) +01:00 |

FIG. 11

| State | Priority | Policy | | Affected Item | Age (hrs ago) | Last Changed Time (GMT +01:00) |
|---|---|---|---|---|---|---|
| Active | ⊗ High | HIPAA | Domain Access | Oracle server on 10.1.1.23 | 2:00 | 2007-02-03 22:20 |
| Active | △ Medium | HIPAA | Domain Access | Oracle server on 10.1.3.88 | 3:00 | 207-02-03 22:20 |
| Active | △ Medium | HIPAA | Domain Access | Oracle server on 10.1.3.75 | 3:12 | 2007-02-03 22:20 |
| Active | △ Medium | HIPAA | Domain Access | Oracle server on 10.3.6.99 | 4:00 | 2007-02-03 22:20 |
| Active | △ Medium | HIPAA | Domain Access | Oracle server on 10.1.1.23 | 4:18 | 2007-02-03 22:20 |
| Active | ⊙ Low | HIPAA | Domain Access | Oracle server on 10.1.1.24 | 5:30 | 2007-02-03 22:20 |
| | | | | Oracle server on 10.1.1.33 | 6:00 | 2007-02-03 22:20 |

Filter found 15 out of 20   Showing 1 - 10 of 15   Page 1 of 1

User: Joe Smith | Role: Compliancy Officer | 2007-05-01 19:20 (GMT) +01:00

FIG. 12

| State | Priority | Policy | Rule | Affected Item | Age (hrs ago) | Last Changed Time (GMT +01:00) |
|---|---|---|---|---|---|---|
| Any | Any | Any | Any | | Any | Any |
| Active | ⊗ High | HIPAA | Connectivity relationship | Oracle server on 10.1.255.255 | 2:00 | 2007-02-03 22:20 |
| Active | △ Medium | HIPAA | Domain access | Oracle server on 10.1.255.255 | 3:00 | 2007-02-03 22:20 |
| Active | △ Medium | HIPAA | Configuration changes detected | Oracle server on 10.1.255.255 | 3:12 | 2007-02-03 22:20 |
| Active | △ Medium | HIPAA | Naming conventions | Oracle server on 10.1.255.255 | 4:00 | 2007-02-03 22:20 |
| Active | △ Medium | HIPAA | Authorized connection protocols | Oracle server on 10.1.255.255 | 4:18 | 2007-02-03 22:20 |
| Active | △ Medium | HIPAA | Job status | Oracle server on 10.1.255.255 | 5:30 | 2007-02-03 22:20 |
| Active | ⊙ Low | HIPAA | Deleted user ID's | Oracle server on 10.2.255.255 | 6:00 | 2007-02-03 22:20 |

User: Joe Smith | Role: Compliancy Officer | 2007-05-01 19:20 (GMT +01:00)

FIG. 13

NETWORK POLICY ENFORCEMENT DASHBOARD VIEWS

BACKGROUND

In a configured information network, such as a managed information network, a network fabric, or infrastructure, interconnects network elements, or nodes, for providing various services to end users that are also connected to the network. In a managed information network, for example, a number of storage arrays are adapted to provide data storage and retrieval services. The storage arrays connect to other elements such as switches and hosts to efficiently provide the services to the users. Further, each storage array includes a set of individual storage devices (e.g. disk drives) that are themselves considered network elements. The collection of elements defines a configuration of the information network that is often updated to respond to changes in the network, such as for performance improvements, message traffic redirection, and equipment failures.

In a typical information network, the number of interconnected elements can become large, resulting in a substantial number of relationships between the network elements (nodes), the network connections between them, and the application that execute on them. Accordingly, a set of rules may be implemented to identify good or mandatory practices in the network, such as providing a redundant link between critical nodes, or always deploying application A on a node with application B, for example. This set of rules defines a policy that network administrators enforce to maintain the network in a predictable and manageable state. However, identifying and verifying each of the rules across the network may become cumbersome in a large network. Further, the policy including the rules may be driven by external factors, such as corporate directives, security requirements, industry best practices, and Federal compliance laws. Therefore, at any particular site or enterprise, there may be multiple policies to be satisfied, each having a plurality of rules in effect.

SUMMARY

In a managed information network, multiple policies proscribing or requiring network practices may be imposed. These policies specify requirements for connections between nodes (hosts), application dependencies for services provided by the nodes, and configurations of individual nodes. Each policy includes a plurality of rules that identifies network elements, or objects (hosts, services, or connections), a scope of the rule identifying which network objects it applies to, and a condition to test for satisfaction of the rule. A passive probe mechanism populates a configuration management database (CMDB) with data concerning network health. A near real time gathering daemon maintains the CMDB in a current state. A policy manager identifies policies in force and the rules included in each, and a violation processor evaluates each rule against the network health data in the CMDB. A display engine receives queries from a user, and displays results in a dashboard view that indicates compliance with each policy and with individual rules in each policy. The dashboard view presents a graphical user interface (GUI) that provides an overview of policy compliance, and allows dill-down queries to interrogate specific rule violations and severity within particular policies.

The dashboard view provides a comprehensive GUI that permits access to each policy in force for the network, and displays an overall compliance rating indicating compliance or non-compliance with each particular policy. Each policy includes a set of rules, and each rule is labeled with a severity. Each policy has a threshold of severe violations that constitute violation of the policy. Selection of individual policies allows display of a drill-down selection of severity of violation trends, rankings of most violated rules, and rankings of violation causes (nodes upon which the violation occurred). A drill down selection of individual policy trends lists rules violated over time and severity for the selected policy. The drill down selection of rules most violated lists each individual violation, the severity, and the node on which it occurred. The drill down selection of causes lists violations on the particular node. Each of the drill down views may be filtered to list a manageable number of detailed violations.

In further detail, a network compliance application, or management application, performs a method of coalescing violation data based on rule and policy violations by retrieving network event data indicative of compliance with a set of policies, in which each of the policies has a set of rules. The application computes, for each of the policies, violations, each violation indicative of a deviation from a particular rule, and displays a summary view indicative of a plurality of policies in the set of policies, the summary view indicative of violations attributable to each of the policies. From the displayed summary view, the application receives a detail selection corresponding to a subset of the displayed violations in the summary view, and displays, for the received detail selection, a detail violation view having a sequence of ranked violation entries corresponding to the detail selection.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

The drawings are not necessarily to scale, emphasis instead being placed upon illustrating the principles of the invention.

DETAILED DESCRIPTION

In a managed information network, a management application provides rule violation reports in a dashboard view that provides an overview of all policies active in a network, and allows a user to drill down to receive specific rule violation reports on pinpointed trouble areas. In the example arrangement, the managed information network may be a storage area network operable to interconnect storage arrays for data storage, retrieval, and recovery services provided to a user community, however the disclosed system is applicable to any suitable managed information network. The dashboard view for rule policy violation disclosed herein is nonetheless operable with a variety of network environments.

The dashboard view therefore coalesces a potentially enormous number of rule violations, and isolates specific details about areas of concern. Such rules are selected as part of a policy, or set of rules, designed to promote or enforce good or mandatory network practices, as disclosed further in copending U.S. patent application Ser. No. 11/769,407, filed Jun. 27, 2007, entitled "POLICY BASED NETWORK COMPLIANCE" and copending U.S. patent application Ser. No. 11/769,499, filed Jun. 27, 2007, entitled "RULE BASED NETWORK RESOURCE COMPLIANCE". For example, in a corporate practices policy, a particular rule may check that web servers in human resources and finance running Redhat™ Linux 3 have update 6. Another rule may specify a check that Oracle® servers in NY and San Jose have shared pool size set to no more than 350 GB.

Such rules are generally in the form of [object] [scope] and [desired state], where the object defines the network object the rule applies to, and scope refines the object set. The objects typically specify hosts (nodes), services (applications) and connections. The desired state identifies a condition that defines the test criteria to determine compliance with the rule. In other words, if the object (network resource) does not meet or exhibit the desired state, the condition for compliance is lacking and compliance fails. Failure to satisfy or comply with the desired state constitutes noncompliance with the rule, and a predetermined number of failed rules indicates failure of the policy to which they belong. The rules of a policy are generally selected along a particular theme, such as security, standards compliance, or efficiency. As a further example, the compliance data indicates a count of connections between nodes. Accordingly, the rules may indicate how to identify whether they should be there or not. A security policy might include a rule to check that all client connections from a call center to a credit card authorization system use a secure protocol. An unsecure connection may indicate a vulnerable link, fraud, or unauthorized employee usage.

Rules may often be predicated on connections between nodes or applications. A retail organization that uses credit cards may have a policy that there should be no connectivity between payroll server and credit card server, since there is no flow in the normal business model that employs such a connection. If the compliance data indicates such a connection, it indicates a potential data breach. Such connection based rules identify if they should exist when they do not, or shouldn't exist when they do. Connection based rules can also identify whether connections are encrypted, since between certain servers (i.e. medical office) connections should always be encrypted. Other rules may be developed by generalizing the expected, appropriate, or efficient relations between the network elements, and composing rules that pinpoint deviations. Further details on the rules and policies are available in the copending applications cited above, incorporated herein by reference.

Figure 1:
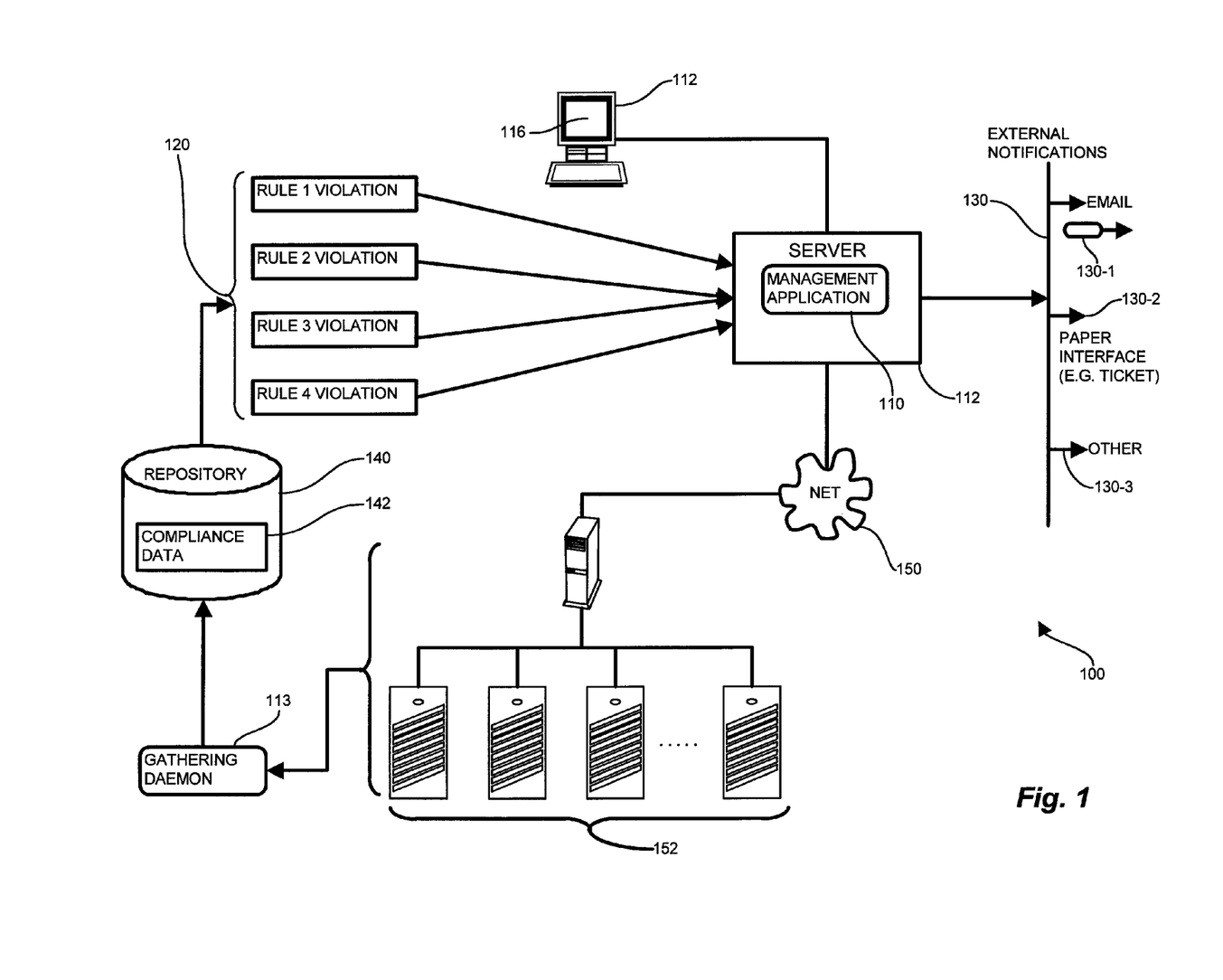
FIG. 1 is a context diagram of a managed information network environment suitable for use with the present invention.

FIG. 1 is a context diagram of a managed information network environment 100 suitable for use with the present invention. Referring to FIG. 1, a network management application (management application) 110 is responsive to rule violation occurrences 120 indicative of network health, and operable to generate external notifications 130 concerning compliance with the rules 120. Each of the rules is part of a policy promoted by a particular corporate, regulatory, or industry for promoting beneficial practices. A network 150 includes a plurality of interconnected nodes 152, or hosts, collectively operable to establish connections, execute applications, and perform services on behalf of other nodes 152 in the network. A repository 140 includes compliance data 142 having information concerning rule violation occurrences 120, and is populated by a gathering daemon 113 that passively probes or scans the network 150 for hosts (nodes running an application), services provided by applications, and connections for communication between applications. The rules, or lack of compliance thereof, result in generation of an external notification 130 of non-compliance, depending on the severity of the violation occurrences 120, discussed in the description and figures that follow. The notifications may take a variety of forms, such as an email 130-1, paper interface 130-2 (e.g. trouble ticket), and other messaging forms 130-3, such as text messaging. The management application 110 executes on a server 112 coupled to a console 114 having a GUI 116 to which the management application 110 is responsive for reports of rule compliance.

Figure 2:
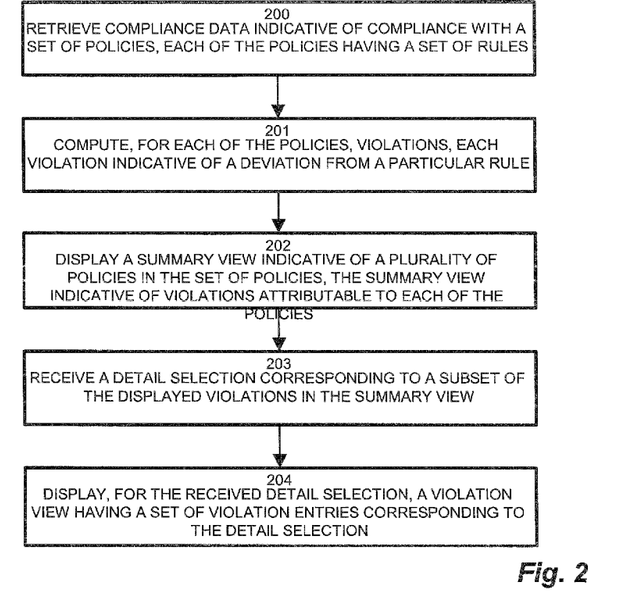
FIG. 2 is a flowchart of policy violation dashboard views in the environment of FIG. 1.

FIG. 2 is a flowchart of policy violation dashboard views in the environment of FIG. 1. Referring to FIGS. 1-3, the method of coalescing compliance data as defined herein includes, at step 200, retrieving compliance data indicative of compliance with a set of policies, such that each of the policies has a set of rules. Each policy includes a plurality of rules, and failure of a predetermined number of rules may fail the entire policy, at the discretion of the operator. The rules also have a severity, and the policy failure threshold may encompass a number of rules of a high severity, rather than trigger policy failure for modest failures of a few rules.

Using the gathered compliance data 142, the management application 110 computes, for each of the policies, violation occurrences, such that each violation is indicative of a deviation from a particular rule, as shown at step 201. The GUI 116 displays a summary view indicative of a plurality of policies in the set of policies, in which the summary view 80 is indicative of violations attributable to each of the policies 147 (FIG. 3), as depicted at step 202. The management application 110 receives a detail selection 92 corresponding to a subset of the displayed violations in the summary view, as shown at step 203, and displays, for the received detail selection 92, a violation view 94 having a set of violation entries corresponding to the detail selection.

Figure 2A:
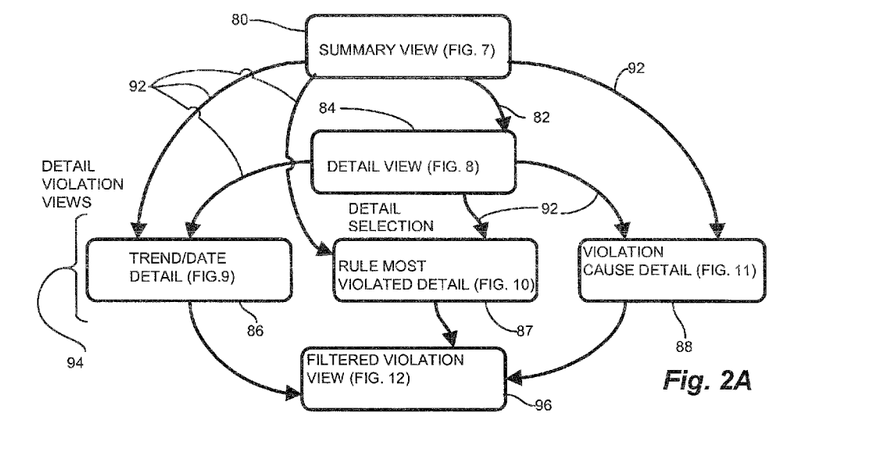
FIG. 2A is a flow diagram of user interface screens in the dashboard views of FIG. 2.
Figure 7:
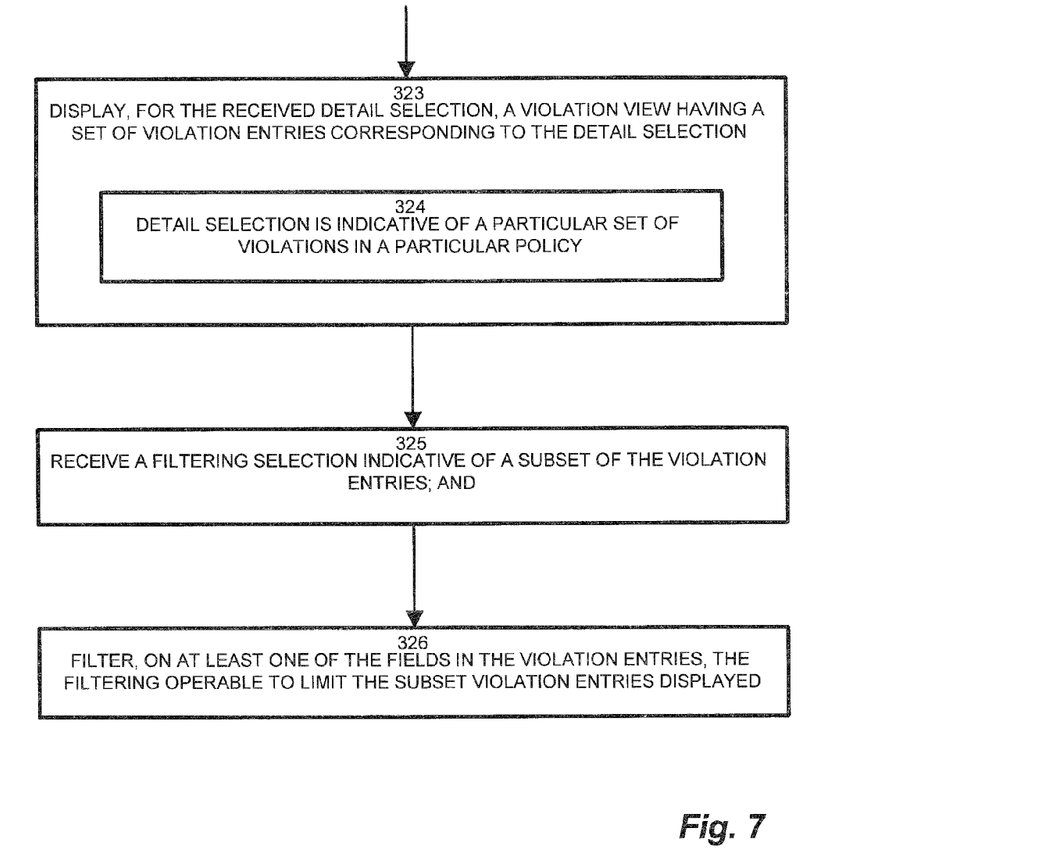

FIG. 2A is a flow diagram of user interface screens in the environment of FIG. 1. An initial state 80 presents a summary dashboard view of all policies, and summarizes violations occurrences, depicted further below in the discussion with respect to FIG. 7. From state 80, a policy selection 82 of a particular policy transitions to a detail view 84, disclosed further below in FIG. 8. From the detail view 84, or alternatively from the summary view 80, a violation detail selection 92 is selectable to present one of violation views 94. The violation views 94 allow a user to drill down into views of trend data 86, shown below in FIG. 10, most violated rules 87, shown below in FIG. 11, or violation causes 88, shown below in FIG. 12. Each of the violation views 94 is filterable to refine the number of violation entries to a manageable level, shown below in FIG. 13 (96).

Figure 3:
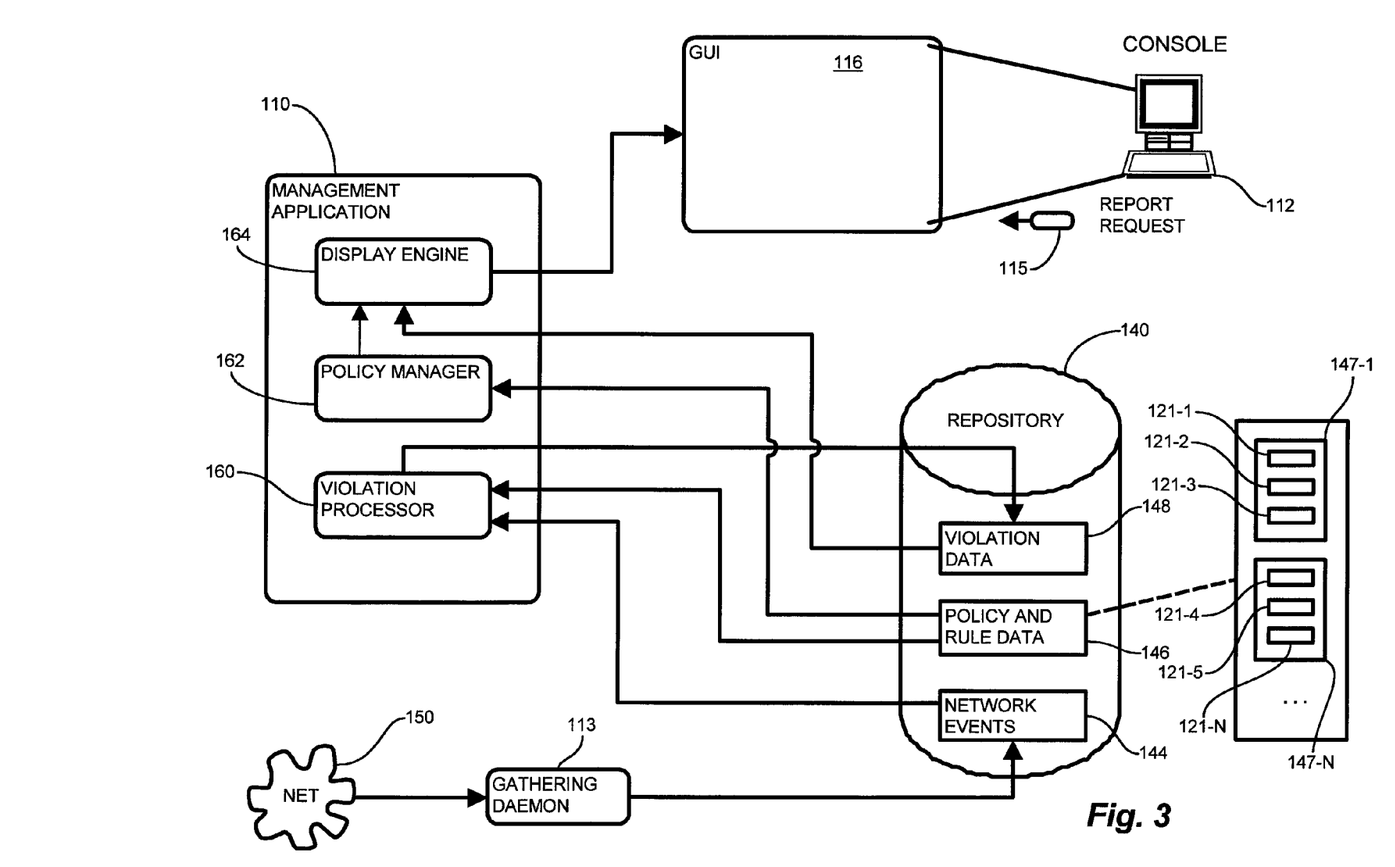
FIG. 3 is an example configuration of a network environment operable according to the history of FIG. 2.
Figure 4:
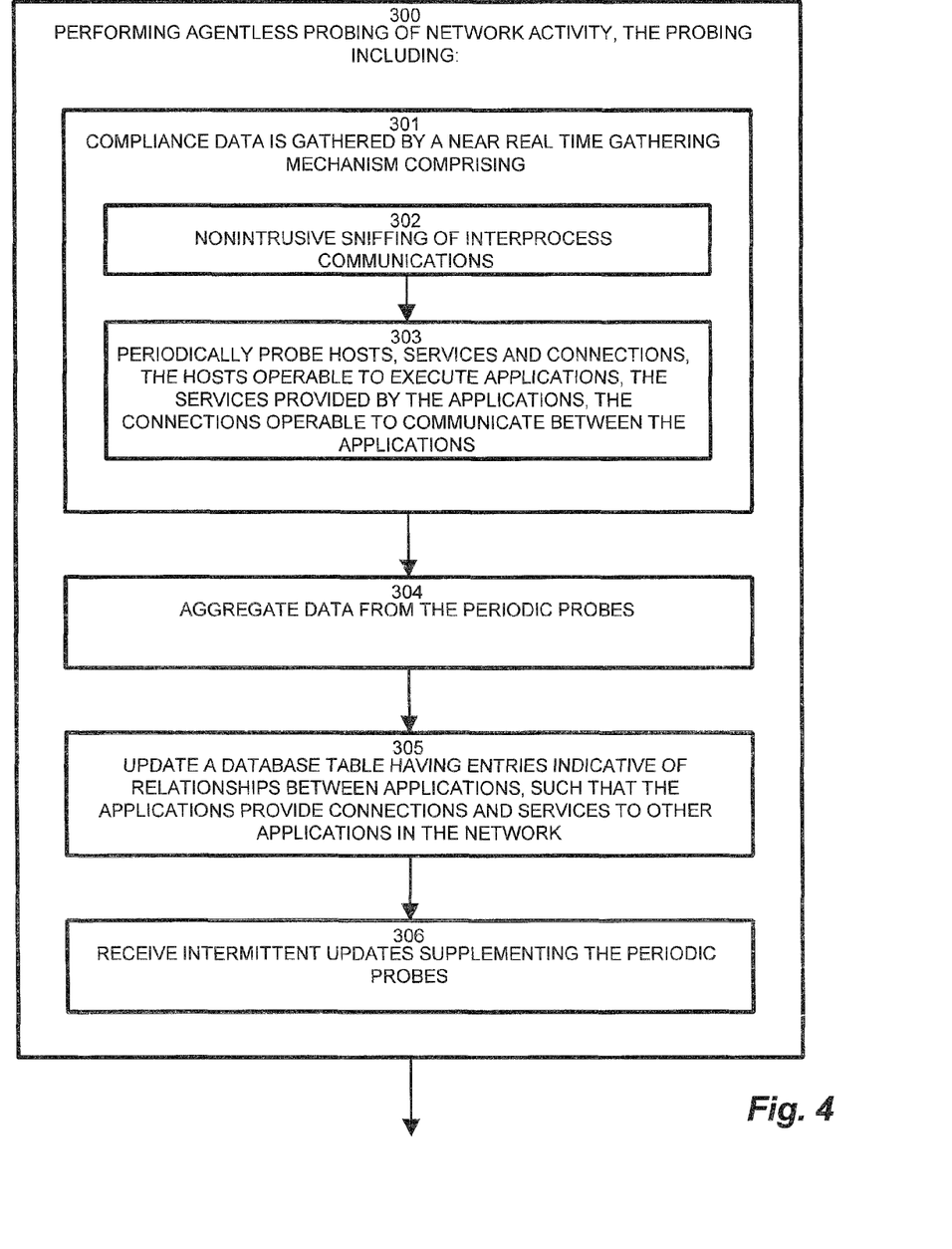
FIGS. 4-7 are a flowchart of screen view processing in the configuration of FIG. 3.
Figure 5:
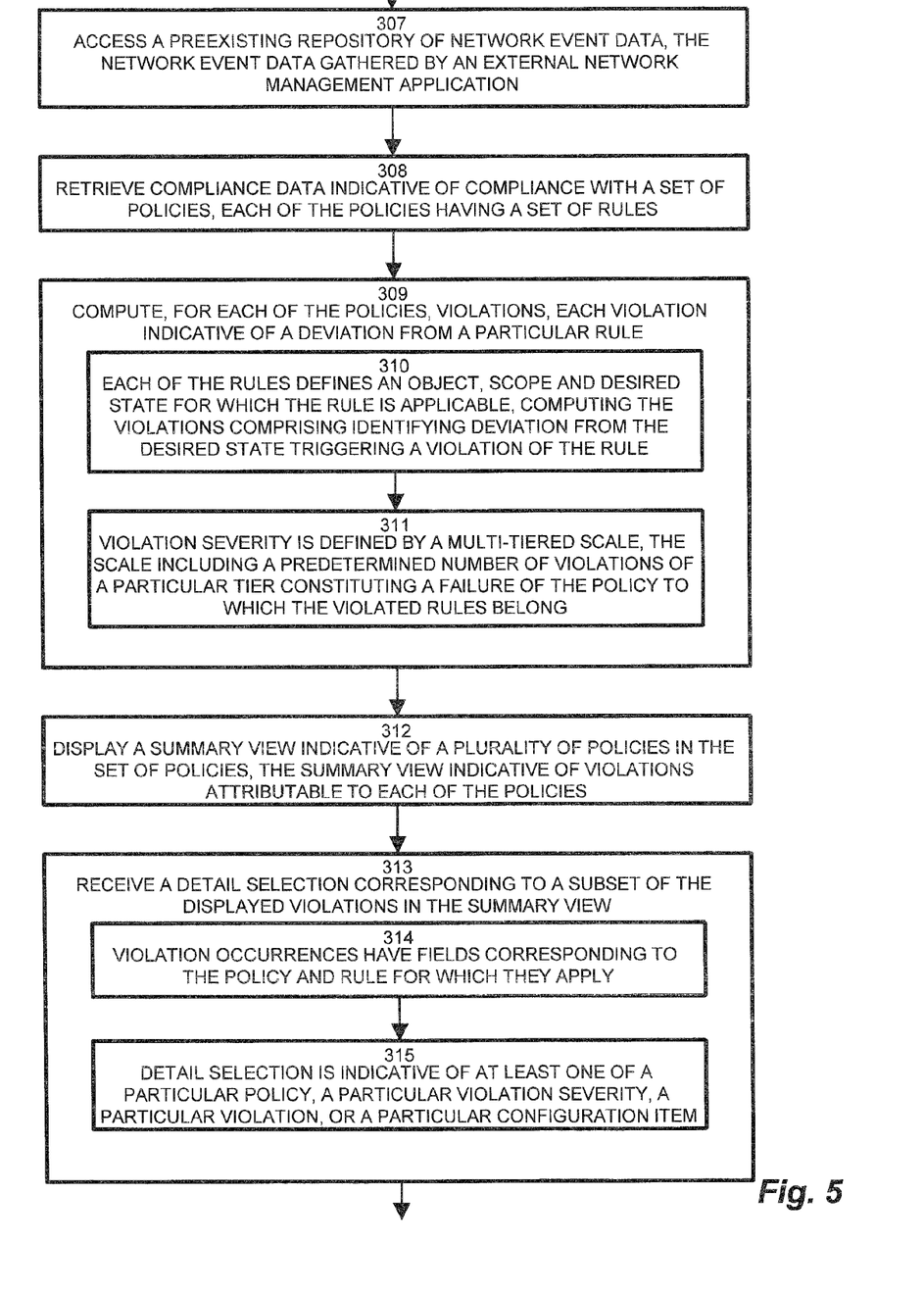
Figure 6:
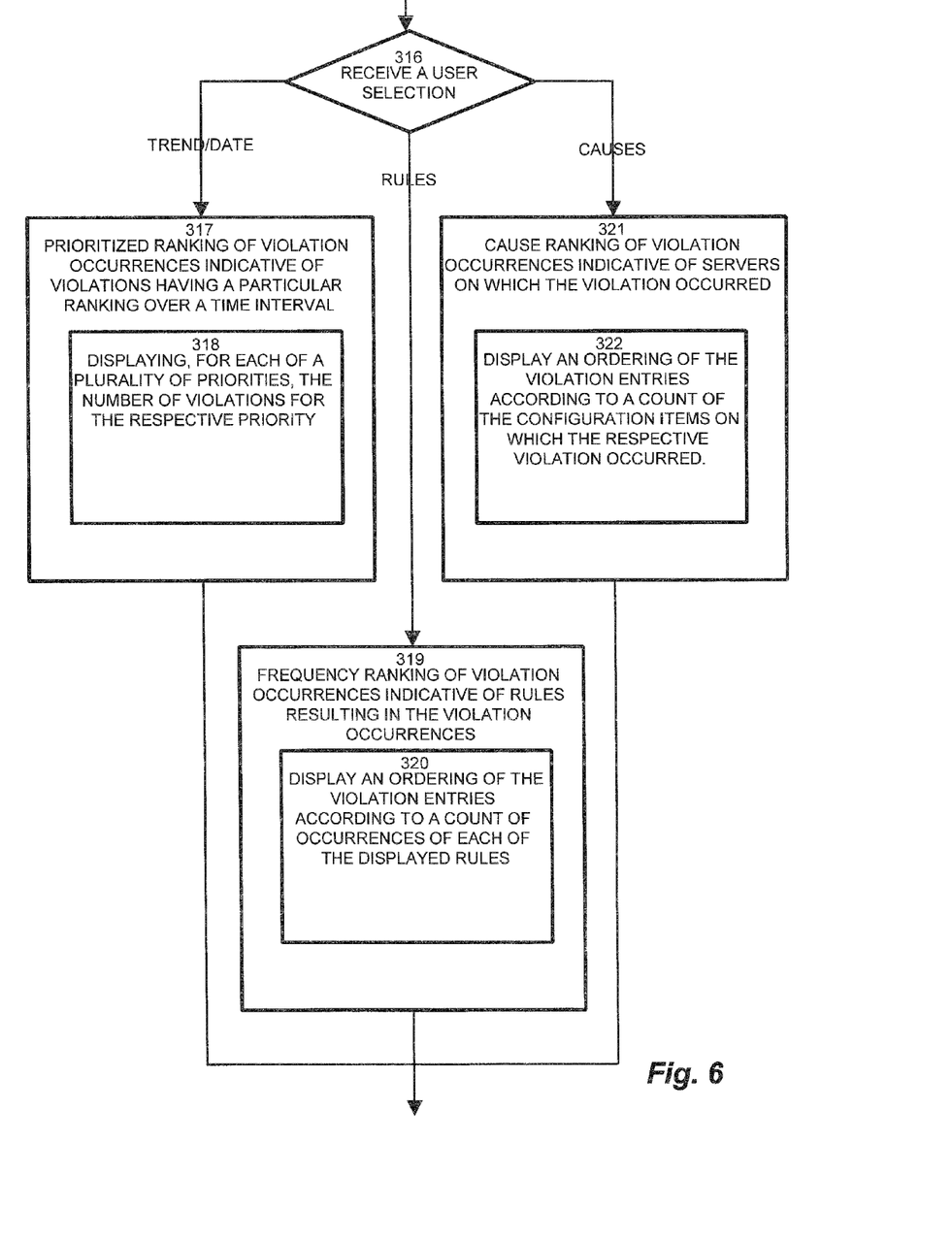

FIG. 3 is an example configuration of a network environment operable according to the flowchart of FIG. 2. Referring to FIG. 3, the management application 110 includes a violation processor 160, a policy manager 162, and a display engine 164. The compliance data 142 in the repository 140 includes network events 144, policy and rule data 146, and violation data 148. The policy and rule data 146 includes applicable policies 147-1 . . . 147-N (147 generally), each including a set of rules 121-1 . . . 121-N (121 generally). Development and management of the policies 147 and rules 121 is discussed further in the copending applications cited above. In operation, the violation processor 160 receives network events 144 and compares them to rules 121 in the policy and rule data 146 for computing rule violations 120. The network events 144 remain current via the gathering daemon 113 coupled to the network. The repository 140 stores the rule violations 120 as violation data 148 for access by the display engine 164. The display engine 164 is responsive to report requests 115 for compliance reports, shown below in FIGS. 8-13. The policy manager 162 identifies, for requested policies, which rules 121 belong to particular policies, the violation occurrences 120 corresponding to those rules, and overall compliance for each of the policies 146. Depending on the particular report requested, discussed below, the display engine 164 presents the policy 147, rule 121 and violation occurrences 120.

FIGS. 4-7 are a flowchart of screen view processing in the configuration of FIG. 3. Referring to FIGS. 3-7, a gathering daemon 113 or other suitable mechanism gathers the compliance data 142 via agentless probing of network activity, as depicted at step 300. In the example arrangement, timeliness of the data is ensured because the compliance data is gathered by a near real time gathering mechanism, shown at step 301. The gathering mechanism (daemon 113 or other suitable processing) performs nonintrusive sniffing of interprocess communications, as depicted at step 302, and periodically probes hosts, services and connections, in which the hosts are operable to execute applications, the services are provided by the applications, and the connections operable to communicate between the applications, as shown at step 303. The gathering mechanism also conducts remote discovery probes to determine deeper configuration data (i.e. more refined, detailed statistics and parameters). The daemon 113 aggregates data from the periodic probes, as disclosed at step 304, and updates a database table in the repository 140, such as the compliance data 142 having entries indicative of relationships between applications, in which the applications provide connections and services to other applications in the network, as shown at step 305. The compliance data 142 in the repository 140 continues receiving intermittent updates supplementing the periodic probes, as depicted at step 306, thereby providing the near real time gathering mechanism through the intermittent updates.

As indicated above, the compliance data 142 in the repository 140 includes network event data 144, policy and rule data 146, and violation data 148. Retrieving the compliance data 142 includes accessing a preexisting repository of network event data 144, as disclosed at step 307, such that the network event data gathered by an external network management application, implemented as the gathering daemon 113 in the example arrangement shown. The network events 144 may therefore be leveraged from a log or monitoring mechanism already in place for overall or general network monitoring, therefore not imposing additional network burdens from the gathering daemon 113 and associated probing. From the event data 144, the violation processor 160 retrieves pertinent compliance data indicative of compliance with the set of policies 147-N, in which each of the policies has a set of rules 121-1 . . . 121-N, as depicted at step 308.

The violation processor 160 computes, for each of the policies 147, violations (violation occurrences) 120, in which each violation is indicative of a deviation from a particular rule 121, as shown at step 309. Each of the rules defines an object, scope and condition for which the rule 121 is applicable, such that computing the violations 120 includes identifying deviation from the desired state triggering (specifying) a violation of the rule 121, as depicted at step 310. Each rule 121 further encompasses a severity, in which the violation severity is defined by a multi-tiered scale, and the scale includes a predetermined number of violations of a particular tier constituting a failure of the policy 147 to which the violated rules 121 belong, as disclosed at step 311.

The display engine 164 displays a summary view 80 indicative of a plurality of policies 147 in the set of policies, such that the summary view 80 is indicative of violations 120 attributable to each of the policies 147, as depicted at step 312. From the summary view 80, the display engine 264 receives from the GUI 116 a detail selection 82 corresponding to a subset of the displayed violations 120 in the summary view 80, as shown at step 313. Each of the violation occurrences 120 have fields corresponding to the policy 147 and rule 121 for which they apply, as shown at step 314, and the detail selection 82 is indicative of at least one of a particular policy, a particular violation severity, a particular violation, or a particular configuration item such as a network object, as depicted at step 315.

Figure 10:
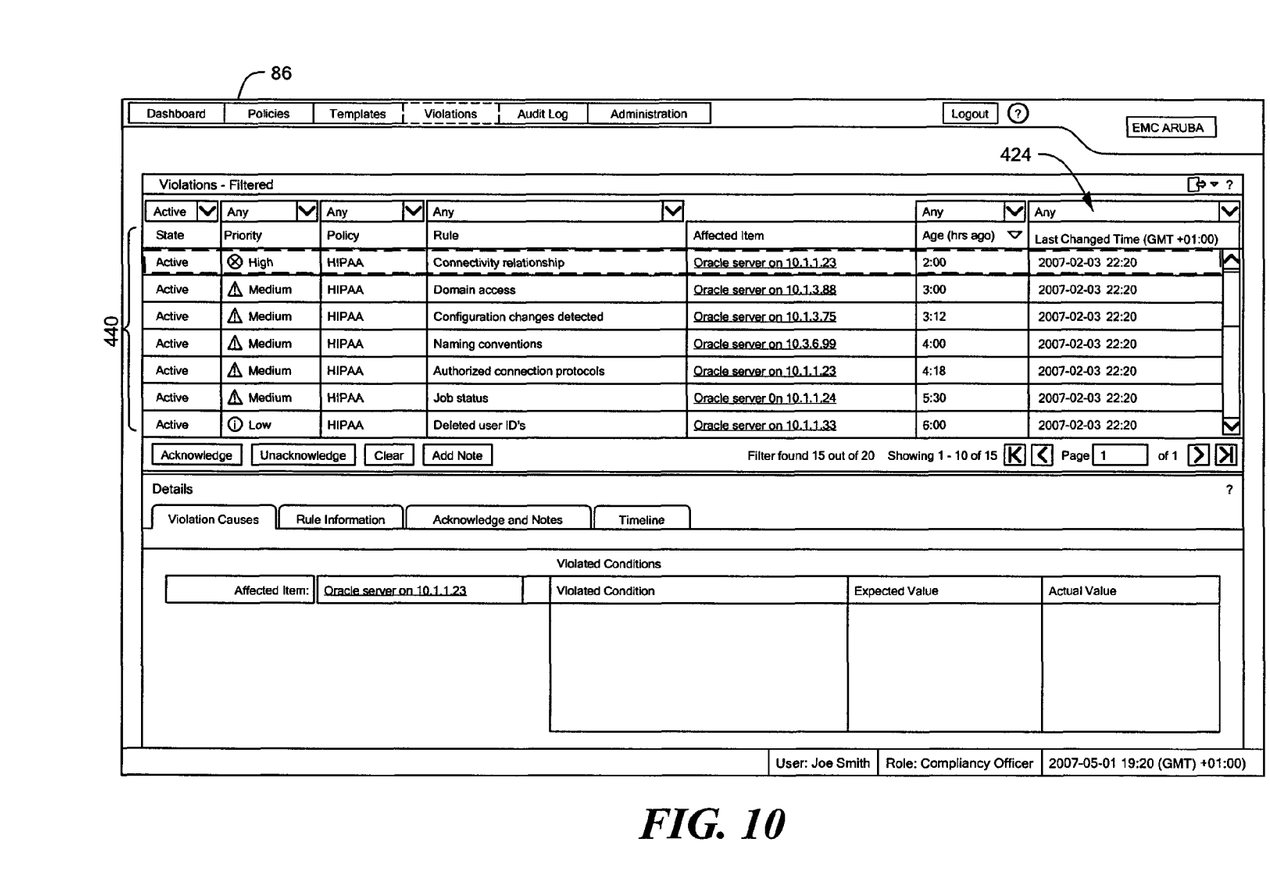
FIG. 10 is drill down view of violation trends from the view of FIG. 8.

From the detail view 84, or alternatively from the summary view 80, the GUI 116 receives a detail selection 92, as shown at step 316. If the detail selection 92 is indicative of a trend/date detail 86, then the display engine 164 displays a prioritized ranking of violation occurrences indicative of violations 120 having a particular ranking over a time interval, shown at step 317, as depicted in FIG. 10. If the detail selection 92 is indicative of a number of violations for a particular policy, the display engine 164 displays, for each of a plurality of priorities, the number of violations for the respective priority, as shown at step 318.

Figure 11:
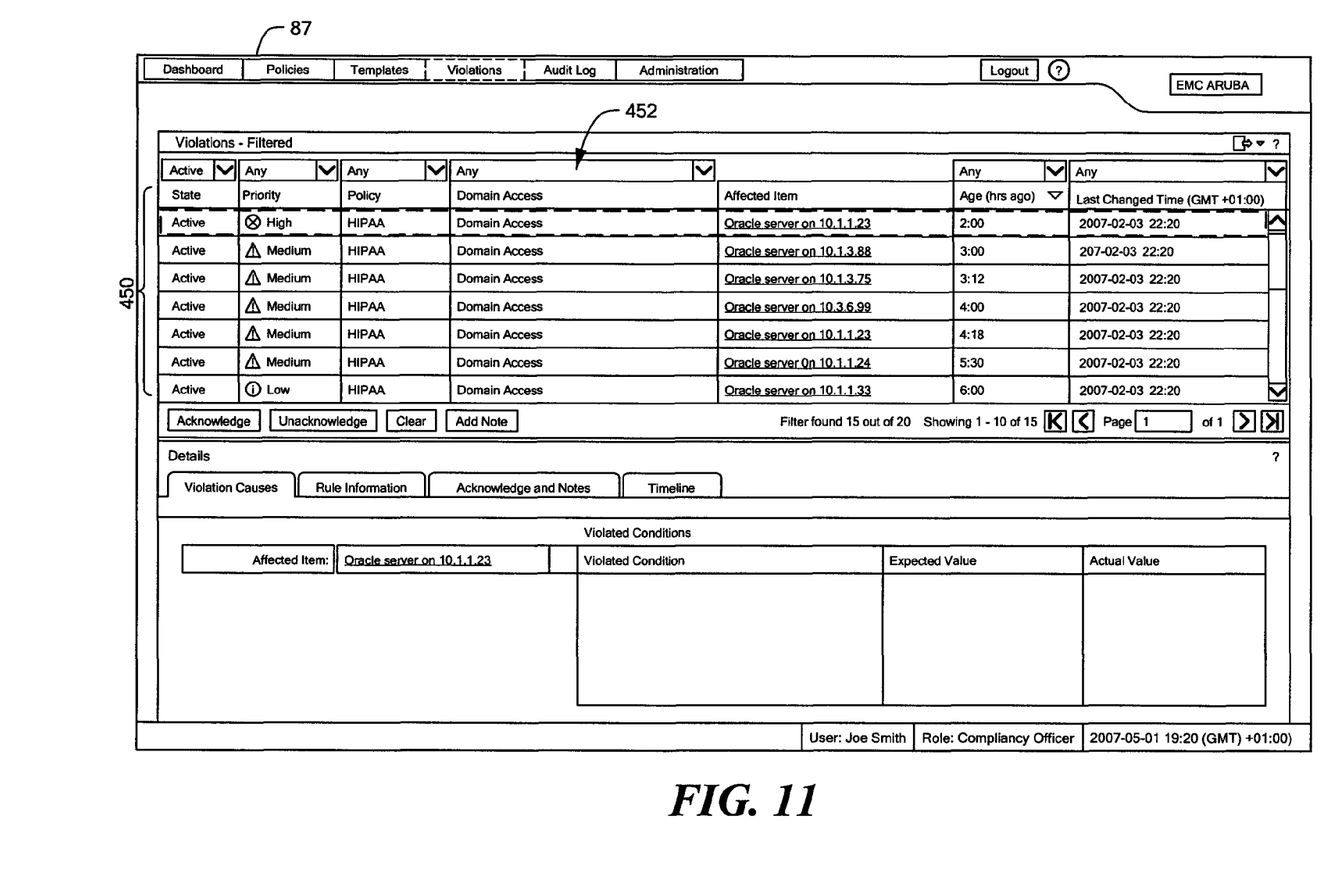
FIG. 11 is a drill down view of violated rules from the view of FIG. 8.

If the detail selection 92 requests a frequency ranking of violation occurrences indicative of rules resulting in the violation occurrences, as depicted at step 319, then the display engine 164 displays an ordering of the violation entries 120 according to a count of occurrences of each of the displayed rules 121, as depicted at step 320 and shown in FIG. 11.

Figure 12:
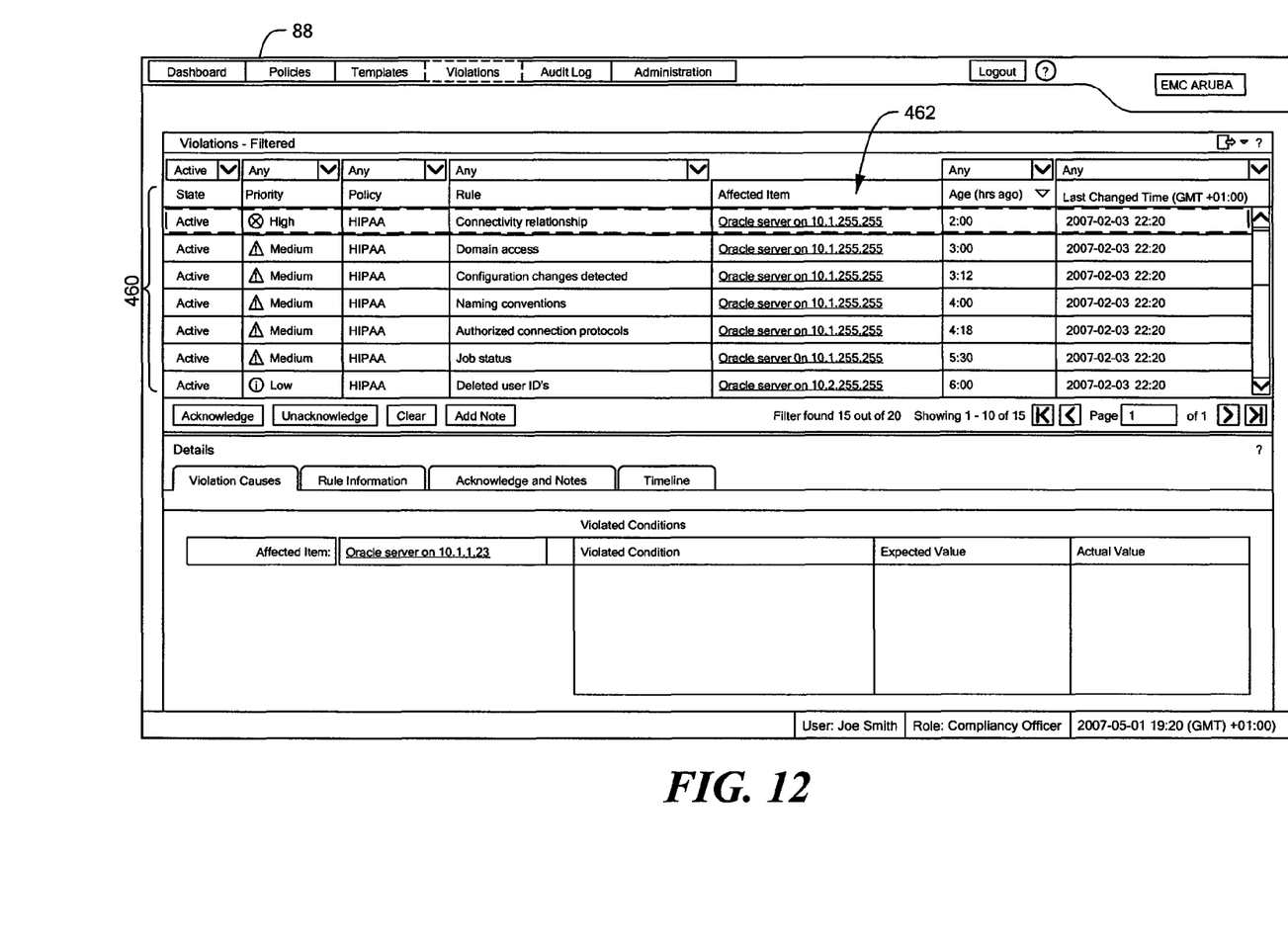
FIG. 12 is a drill down view of violation causes from the view of FIG. 8.

If the detail selection 92 is indicative of a cause ranking of violation occurrences indicative of servers (hosts) 152 on which the violation occurred, as depicted at step 321, then the display engine 164 presents count of objects attributable to rule violations 120 by displaying an ordering of the violation entries 120 according to a count of the configuration items (host or node) 152 on which the respective violation occurred, as disclosed at step 322, shown in FIG. 12.

For each of the detail violation views 94, the GUI 116 displays, for the received detail selection 92, a violation view having a set of violation entries 120 in tabular form corresponding to the detail selection 92, as shown at step 323. In the example shown, the detail selection 92 is indicative of a particular set of violations in a particular policy 147, as depicted at step 324. Alternate arrangements may present detail violation views 94 for all policies. In the event that an unwieldy number of violation occurrences 120 result, a filter 500 may be invoked, such that displaying the detail selection 92 further includes receiving a filtering selection indicative of a subset of the violation entries, as depicted at step 325. The filtering selection includes the violation fields state 502, priority 504, policy 506, rule 508, age 510, and entry time 512. The display engine 164 filters, on at least one of the fields 502 . . . 512 in the violation entries 120, such that the filtering fields are operable to limit the subset violation entries 120 displayed.

Figure 8:
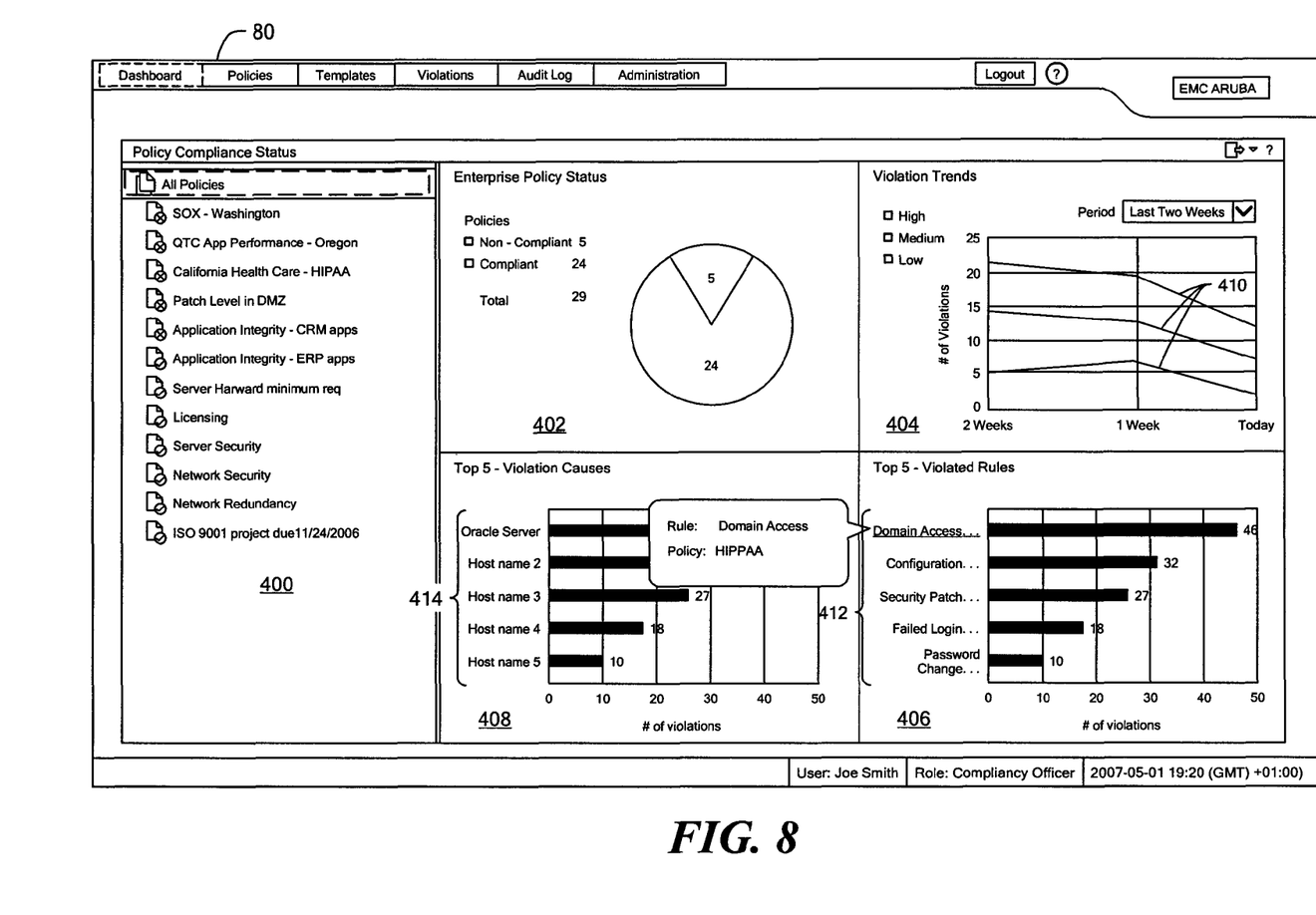
FIG. 8 is a view of all policies' compliance data and violations.

FIG. 8 is a view of all policies' compliance data and violations. Referring to FIGS. 3 and 8, the summary view 80 of FIG. 8 includes a policy selection window 400, a policy status window 402, a violation trends window 404, a violated rules window 406, and a violation causes window 408. The policy selection window 400 allows selection of all policies or specified individual policies to be reported in the other windows 402, 404, 406 and 408. The policy status window 402 indicates overall compliance for all policies as a pie chart, and thus is only shown when "all policies" is selected in the policy selection window 400. The violation trends window 404 indicates, for each severity level (high, medium, low) a line graph 410 of violations 120 of each severity. The violated rules window 406 presents a histogram report of the rules 121 most violated 412. The violation causes window 408 shows a histogram report of the network nodes (hosts) most frequently associated 414 with violations 120, thus assisting in identifying a "problem" or compromised host.

Figure 9:
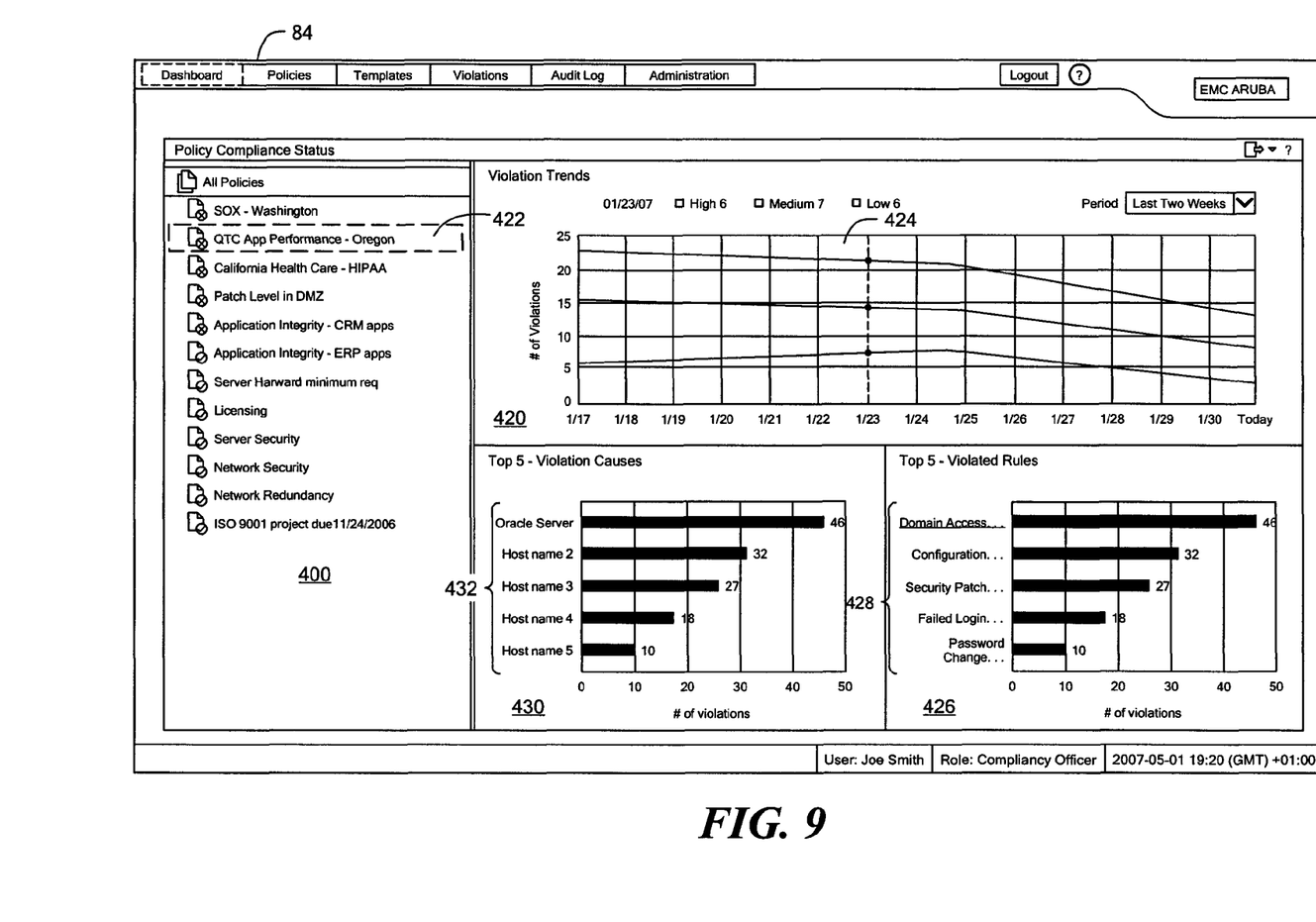
FIG. 9 is a drill down view of a specific policy from the view of FIG. 7.

FIG. 9 is a drill down view of a specific policy from the view of FIG. 8. From the summary view 80, a detail selection 82 (FIG. 8) of an individual policy is selectable, or alternately a violation selection 92 of an individual policy 147 for a detail violation view 94, including views 86-88. The detail view 84, shown in FIG. 9, depicts a policy specific trends window 420 showing a graph of violation severity for the selected policy 422. The trends window 420 also allows selection of a detail violation view 94 through selection of a specific date 424. A policy specific rules window 426 shows a histogram 428 of rules 121 most violated in the selected policy, and a policy specific cause window 430 shows a histogram 432 of causes (hosts) most associated with failures 120.

Figure 13:
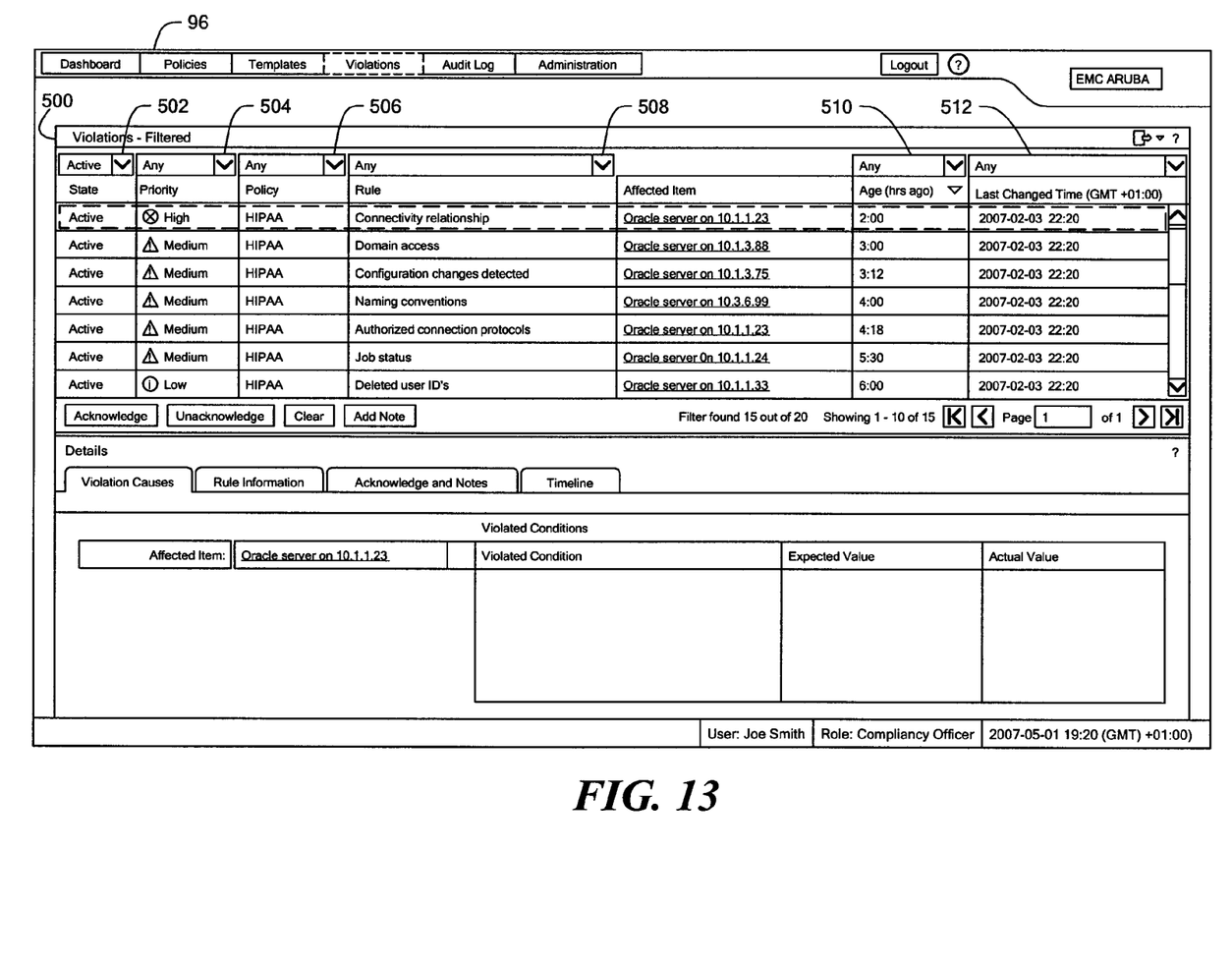
FIG. 13 is a drill down view of violation entry filtering from the views of FIGS. 10, 11 and 12.

From the detail view 84, a detail selection 92 is receivable. Alternatively, a detail selection applicable to all policies may be invoked from the summary view 80. FIG. 10 is drill down view of violation trends from the view of FIG. 8. FIG. 11 is a drill down view of violated rules from the view of FIG. 9, and FIG. 12 is a drill down view of violation causes from the view of FIG. 8. A detail selection 92 for trend/date detail presents a set 440 of violation occurrences 120 occurring on the specified date 424, or alternatively a date/time range, as shown in FIG. 10. A detail selection 92 requesting a violated rules 428 view shown in FIG. 11 presents a set 450 of violation occurrences 120 triggered by the selected rule 452. A detail selection 92 indicative of violation causes 432 generates a set 460 of violation entries 120 occurring on the selected host 462, as defined by a common name or network address, depicted in FIG. 12. FIG. 13 is a drill down view of violation entry filtering from the views of FIGS. 10, 11 and 12. Each of the detail selections 86-88 is filterable on filter fields 502-512, shown in FIG. 13, using the filter 500 pull downs.

Those skilled in the art should readily appreciate that the programs and methods for presenting policy violation views as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for presenting policy violation views has been particularly shown and described with references to embodiments thereof, it will be understood by those skilled in the art that various changes in form and details may be made therein without departing from the scope of the invention encompassed by the appended claims.

What is claimed is:

1. A computer-implemented method of coalescing compliance data at a node in a network, the method comprising:

retrieving compliance data indicative of compliance with a set of policies, each of the policies having a set of rules;

computing, for each of the policies, violations, each violation indicative of a deviation from a particular rule;

displaying a summary view indicative of a plurality of policies in the set of policies, the summary view indicative of violations attributable to each of the policies;

receiving, from a user, a detail selection corresponding to a subset of the displayed violations in the summary view; and displaying, for the received detail selection, a violation view having a set of violation entries corresponding to the detail selection, receiving the detail selection further comprising receiving a user selection indicative of at least one of:

a prioritized ranking of violation occurrences indicative of violations having a particular ranking over a time interval;

a frequency ranking of violation occurrences indicative of rules resulting in the violation occurrences; and a cause ranking of violation occurrences indicative of servers on which the violation occurred, each of the violations having a violation severity defined by a multi-tiered scale, the scale including a predetermined number of violations of a particular tier constituting a failure of the policy to which the violated rules belong, retrieving the compliance data further comprising agentless probing of network activity, the probing including:

nonintrusive sniffing of interprocess communications without invoking agents on a monitored host in the network;

conducting remote discovery probes to determine deeper configuration data; and updating a database table having entries indicative of relationships between applications, such that the applications provide connections and services to other applications in the network.

2. The method of claim 1 wherein the violation occurrences have fields corresponding to the policy and rule for which they apply.

3. The method of claim 1 wherein each of the rules defines an object, scope and desired state for which the rule is applicable, computing the violations comprising identifying deviation from the desired state triggering a violation of the rule.

4. The method of claim 3 wherein the detail selection is indicative of at least one of a particular policy, a particular violation severity, a particular violation, or a particular network object.

5. The method of claim 1 wherein the detail selection is indicative of a particular set of violations in a particular policy.

6. The method of claim 5 wherein compliance data is gathered by a near real time gathering mechanism comprising:

periodically probing hosts, services and connections, the hosts operable to execute applications, the services provided by the applications, the connections operable to communicate between the applications;

aggregating data from the periodic probes; and receiving intermittent updates supplementing the periodic probes.

7. The method of claim 6 wherein displaying the detail selection further comprises:

receiving a filtering selection indicative of a subset of the violation entries; and filtering, on at least one of the fields in the violation entries, the filtering selection operable to limit the subset violation entries displayed.

8. The method of claim 7 wherein detail selection is indicative of a particular policy, further comprising:

displaying, for each of a plurality of severities, the number of violations for the respective severity.

9. The method of claim 7 wherein the detail selection is indicative of a frequency of rule violations, further comprising:

displaying an ordering of the violation entries according to a count of occurrences of each of the displayed rules.

10. The method of claim 1 wherein retrieving the compliance data comprises accessing a preexisting repository of network event data, the network event data gathered by an external network management application.

11. The method of claim 4 wherein the violation severity is defined by a multi-tiered scale, the scale including a predetermined number of violations of a particular tier constituting a failure of the policy to which the violated rules belong.

12. A network compliance device responsive to a network compliance application comprising:

a network event repository storing retrieved compliance data indicative of compliance with a set of policies, each of the policies having a set of rules;

a violation processor computing, for each of the policies, violations, each violation indicative of a deviation from a particular rule;

a display engine displaying a summary view indicative of a plurality of policies in the set of policies, the summary view indicative of violations attributable to each of the policies;

a policy manager receiving a detail selection corresponding to a subset of the displayed violations in the summary view, the display engine further operable to display, for the received detail selection, a violation view having a set of violation entries corresponding to the detail selection, receiving the detail selection further comprising receiving a user selection indicative of at least one of:

a prioritized ranking of violation occurrences indicative of violations having a particular ranking over a time interval;

a frequency ranking of violation occurrences indicative of rules resulting in the violation occurrences; and a cause ranking of violation occurrences indicative of servers on which the violation occurred, each of the violations having a violation severity defined by a multi-tiered scale, the scale including a predetermined number of violations of a particular tier constituting a failure of the policy to which the violated rules belong;

the retrieved compliance data obtained from agentless probing of network activity, the probing including:

nonintrusive sniffing of interprocess communications without invoking agents on a monitored host in the network;

conducting remote discovery probes to determine deeper configuration data; and updating a database table having entries indicative of relationships between applications, such that the applications provide connections and services to other applications in the network.

13. The device of claim 12 wherein the violation occurrences have fields corresponding to the policy and rule for which they apply, each of the rules defining an object, scope and desired state for which the rule is applicable, computing the violations including identifying deviation from the condition defining a violation of the rule.

14. The device of claim 13 wherein the user selection selectively invokes the display engine to perform at least one of:

displaying, for each of a plurality of severity, the number of violations for the respective severity;

displaying an ordering of the violation entries according to a count of occurrences of each of the displayed rules; and displaying an ordering of the violation entries according to a count of the network object on which the respective violation occurred.

15. The device of claim 14 wherein the display engine further:

receives a filtering selection indicative of a subset of the violation entries; and filters, on at least one of the fields in the violation entries, the filtering selection operable to limit the subset violation entries displayed.

16. A computer program product having a non-transitory computer readable storage medium operable to store computer program logic embodied in computer program code encoded as a set of processor based instructions thereon for displaying a policy compliance report comprising:
   computer program code for retrieving compliance data indicative of compliance with a set of policies, each of the policies having a set of rules;
   computer program code for computing, for each of the policies, violations, each violation indicative of a deviation from a particular rule;
   computer program code for displaying a summary view indicative of a plurality of policies in the set of policies, the summary view indicative of violations attributable to each of the policies;
   computer program code for receiving, from a user, a detail selection corresponding to a subset of the displayed violations in the summary view; and
   computer program code for displaying, for the received detail selection, a violation view having a set of violation entries corresponding to the detail selection, computer program code for receiving the detail selection further comprising computer program code for receiving a user selection indicative of at least one of:
      a prioritized ranking of violation occurrences indicative of violations having a particular ranking over a time interval;
      a frequency ranking of violation occurrences indicative of rules resulting in the violation occurrences; and
      a cause ranking of violation occurrences indicative of servers on which the violation occurred, each of the violations having a violation severity defined by a multi-tiered scale, the scale including a predetermined number of violations of a particular tier constituting a failure of the policy to which the violated rules belong, the computer program code for retrieving the compliance data further comprising computer program code for agentless probing of network activity, the computer program code for agentless probing including:
      computer program code for nonintrusive sniffing of interprocess communications without invoking agents on a monitored host in the network;
      computer program code for conducting remote discovery probes to determine deeper configuration data; and
      computer program code for updating a database table having entries indicative of relationships between applications, such that the applications provide connections and services to other applications in the network.

17. The method of claim 1 further comprising retrieving compliance data via a gathering daemon that passively scans the network for:
   hosts executing an application;
   services provided by applications; and
   connections for communication between applications.

18. The method of claim 1 further comprising:
   displaying a set of policies or selecting at least one policy from the set of policies;
   receiving, from the user, a policy selection indicative of a particular policy; periodically probing hosts for violations of the particular policy; transitioning to a detail view of the particular policy;
   receiving, from the user, a selection for a type of violation views; and
   displaying a violation view, the violation view filtered for rendering a manageable volume of display data.

* * * * *